Figure 1:
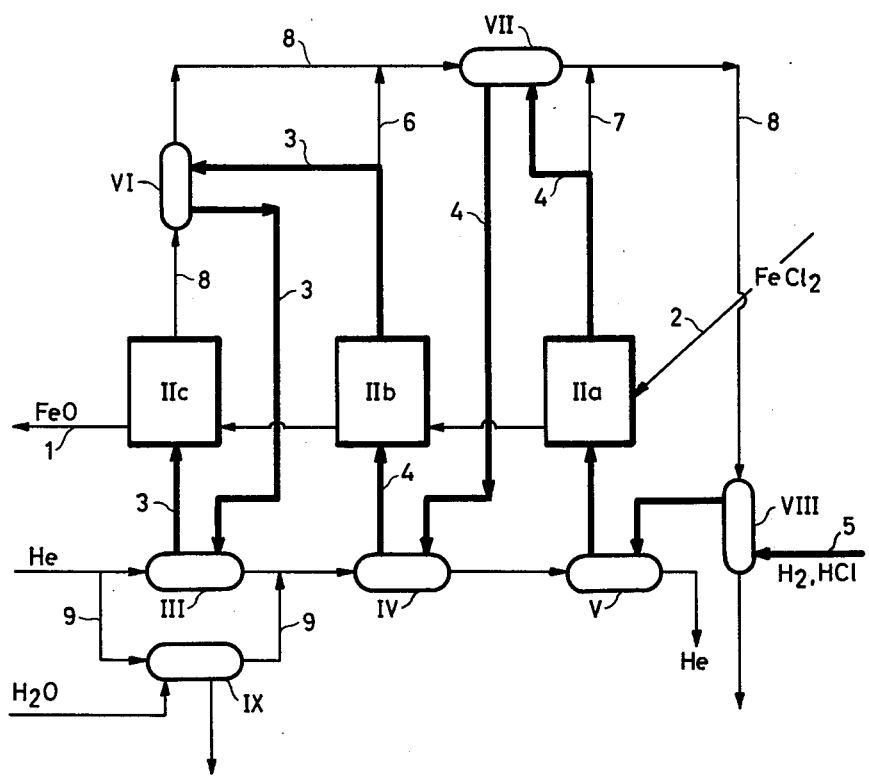

United States Patent [19]

Knoche et al.

[11] 4,145,402
[45] Mar. 20, 1979

[54] PROCESS FOR THE PRODUCTION OF HYDROGEN AND OXYGEN FROM WATER

[75] Inventors: Karl F. Knoche; Helmut Cremer, both of Aachen; Gerhard Steinborn, Wuerselen, all of Fed. Rep. of Germany

[73] Assignee: Rheinische Braunkohlenwerke Aktiengesellschaft, Cologne, Fed. Rep. of Germany

[21] Appl. No.: 841,834

[22] Filed: Oct. 13, 1977

Related U.S. Application Data

[63] Continuation-in-part of Ser. No. 685,398, May 11, 1976, abandoned.

[30] Foreign Application Priority Data

May 16, 1975 [DE] Fed. Rep. of Germany ....... 2521839

[51] Int. Cl.$^2$ .......................... C01B 1/05; C01B 13/02
[52] U.S. Cl. .................................... 423/579; 423/632; 423/657
[58] Field of Search ............... 423/579, 657, 658, 481, 423/632

[56] References Cited

U.S. PATENT DOCUMENTS

| | | | |
|---|---|---|---|
| 3,842,164 | 10/1974 | Newtorf | 423/657 X |
| 3,939,257 | 2/1976 | Pangborn et al. | 423/658 |
| 3,998,942 | 12/1976 | Pangborn et al. | 423/657 X |
| 4,011,305 | 3/1977 | Schulten et al. | 423/579 |

FOREIGN PATENT DOCUMENTS

2254346  5/1973  Fed. Rep. of Germany ........... 423/481

*Primary Examiner*—Edward J. Meros
*Attorney, Agent, or Firm*—Connolly and Hutz

[57] ABSTRACT

A multi-phase thermochemical circulating process for producing hydrogen and oxygen from water is described, using the system of iron and chlorine compounds. Hydrogen is released by the reaction of iron-(II)-oxide with water vapor and the oxygen by the reaction of chlorine with water vapor, iron(II)-oxide or iron (II, III)-oxide. Intermediately-formed iron (II)-chloride is hydrolyzed with water vapor to iron(II)-oxide in a multi-stage reaction at a gradually raised temperature, whereby in the hydrolysis the formation of metallic iron or of iron(II, III)-oxide is avoided.

3 Claims, 2 Drawing Figures

PROCESS FOR THE PRODUCTION OF HYDROGEN AND OXYGEN FROM WATER

CROSS-REFERENCE TO RELATED APPLICATION

This application is a continuation-in-part of our co-pending application Ser. No. 685,398 filed May 11, 1976, and now abandoned.

BACKGROUND OF THE INVENTION

Various thermochemical processes have already been suggested by means of which water can be decomposed in several reaction steps into hydrogen and oxygen using inorganic iron compounds and chlorine or hydrogen chloride as auxiliary agents, whereby these are reacted and regenerated in a closed cycle during the carrying out of the processes. However, technical problems and industrial material questions often arise so that an economical carrying out of the process variants required becomes difficult.

In a known thermochemical process hydrogen is obtained from water by reacting, in a first process step, water vapor at about 600–1300 K with iron(II)-oxide to form iron (II, III)-oxide and hydrogen. In a further process step, oxygen is produced by the reaction of water vapor, iron (II, III)-oxide or iron(II)-oxide at about 550–1300 K with chlorine. Iron(II, III)-oxide from the first process step is reacted, e.g., with hydrogen chloride, while recovering chlorine for use in the second process step, to form iron (II)-chloride. From the iron(II)-chloride, iron(II)-oxide is formed in a hydrolysis reaction with water vapor. The iron(II)-oxide so obtained is returned to the first process step. The hydrogen and oxygen so formed are drawn off as product gases from the process.

The production of oxygen can take place in several different ways. Thus, chlorine and water vapor can be converted in a known manner at high temperatures, for example, 1000–1100 K, to oxygen and hydrogen chloride. If reacting water vapor simultaneously with chlorine and iron oxide, the exothermic oxidation of the iron oxide according to the equation:

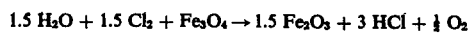

$$1.5\ H_2O + 1.5\ Cl_2 + Fe_3O_4 \rightarrow 1.5\ Fe_2O_3 + 3\ HCl + \tfrac{1}{2} O_2$$

can yield the necessary reaction heat. Furthermore, it is possible to react iron(II)-oxide or iron(II, III)-oxide directly with chlorine, in which case besides oxygen there is obtained iron(III)-chloride. In the last instance, iron(III)-oxide is formed, which reacts with further chlorine to iron(III)-chloride intermediate which is cleaved into iron(II)-chloride and chlorine.

The recovery of the iron(II)-oxide takes place by means of the intermediate step of the iron(II)-chloride formation and is possible in various manners at temperatures ranging from 500–1300 K. Thus, iron(II, III)-oxide may be converted with hydrogen chloride at temperatures of about 500–1000 K and optionally even higher to iron(II)-chloride. The reaction of the iron(II, III)-oxide can also take place with a chlorine and hydrogen chloride mixture with temperatures of about 800–1300 K prevailing.

DESCRIPTION OF THE INVENTION

It has now been found that the described process can be much improved if the hydrolysis of the iron(II)-chloride is conducted in a certain manner. According to the invention, the iron(II)-chloride is converted to iron(II)-oxide by a hydrolysis reaction with water vapor at temperatures of about 700–1200 K in the presence of hydrogen, whereby the water vapor to hydrogen ratio is selected between about 1:3 to 2:1. Advantageously, it is 1:1. Higher hydrogen proportions favor the separation of the product mixture obtained. The presence of hydrogen involves additional advantages with respect to the selection of material, since as a result of the reducing requirements, the difficulties of corrosion are reduced. Furthermore, the reaction to iron(II)-oxide in the presence of hydrogen is conducted in a number of series-connected reaction chambers, e.g., two to five, which are maintained sequentially at a given time at a higher temperature level within the range of 700–1200 K, for example, with respect to two reactors at about 700–950 and 950–1200 K or to three reactors at about 700–800, 800–1000 and 1000–1200 K, respectively. Of course, depending on the requirements, a variation of these levels is possible. By conducting the hydrolysis of the iron(II)-chloride according to the invention, surprisingly there does not occur a reduction to iron but also no oxidation to iron(II, III)-oxide.

If in the scope of the cyclic process the coupling of the process heat from high-temperature nuclear reactors is desired, it is according to the invention of advantage to undertake this in the hydrolysis of the iron(II)-chloride into the iron(II)-oxide. In this connection, the working with several reactions chambers is advantageous to achieve an optimum utilization of the process heat.

It is then of particular advantage to combine the utilization of the, e.g., 1300 K hot nuclear reactor coolant with the utilization of the heat in the product gases leaving a hydrolysis reactor. The utilization of the heat is then flexible over the entire temperature range of the coolant. Said combination can be realized for all, but also for only one part, of the reactors. Additional flexibility in heat utilization is also obtained if the heat of the product gases is utilized only partially with that of the hot coolant. Higher temperatures can be achieved in such a manner in the hydrolysis reactors. Such a procedure involves the further advantage that the partial hydrogen pressure can be adjusted better in the hydrolysis reaction chambers, which is of importance because of a dependable avoidance of an oxidation and because of the required observance of protection of the materials by a carefully set reducing atmosphere.

Of course in the carrying out of the individual reaction steps, it is possible to work at elevated pressures, e.g., up to 60 atmospheres.

FIG. 1 illustrates in simplified form an advantageous type of conducting the hydrolysis reaction according to the invention. In this connection, the usual separating and purifying apparatus, required per se, are not shown for the sake of clarity.

Coming through conduit 2, $FeCl_2$ passes three series-connected hydrolysis reactors IIa, IIb and IIc, which are maintained at 740, 830 and 1020 K. The FeO leaving the reactor IIc by way of conduit 1 is conducted to a hydrogen generator (not illustrated). The heating of the hydrolysis reactors occurs by means of heat exchangers by hot helium of about 1300 K, which had been used as coolant in a high-temperature nuclear reactor, as well as partially by the product gases leaving the reactors. The helium flows through heat exchangers III, IV and V and transmits its heat to hydrolysis exhaust gases or to hydrogen-containing gases from a $H_2$ separating apparatus (not shown), supplied through conduits 3, 4 and 5 and preheated in heat exchangers VI, VII and VIII, said gases, then completely heated, being conducted into the respective reactors. The hydrolysis exhaust gases not passing through heat exchangers VI and VII are conducted through conduits 6 or 7 into the product gas conduit 8 and reach the apparatus for hydrogen separation and thereafter for chlorination of $Fe_3O_4$ (not illustrated). A side stream of hot helium is conducted over conduit 9 and through heat exchanger IX. Therein, water vapor, which is used in a further process step, is heated to about 1250 K.

Figure 2:
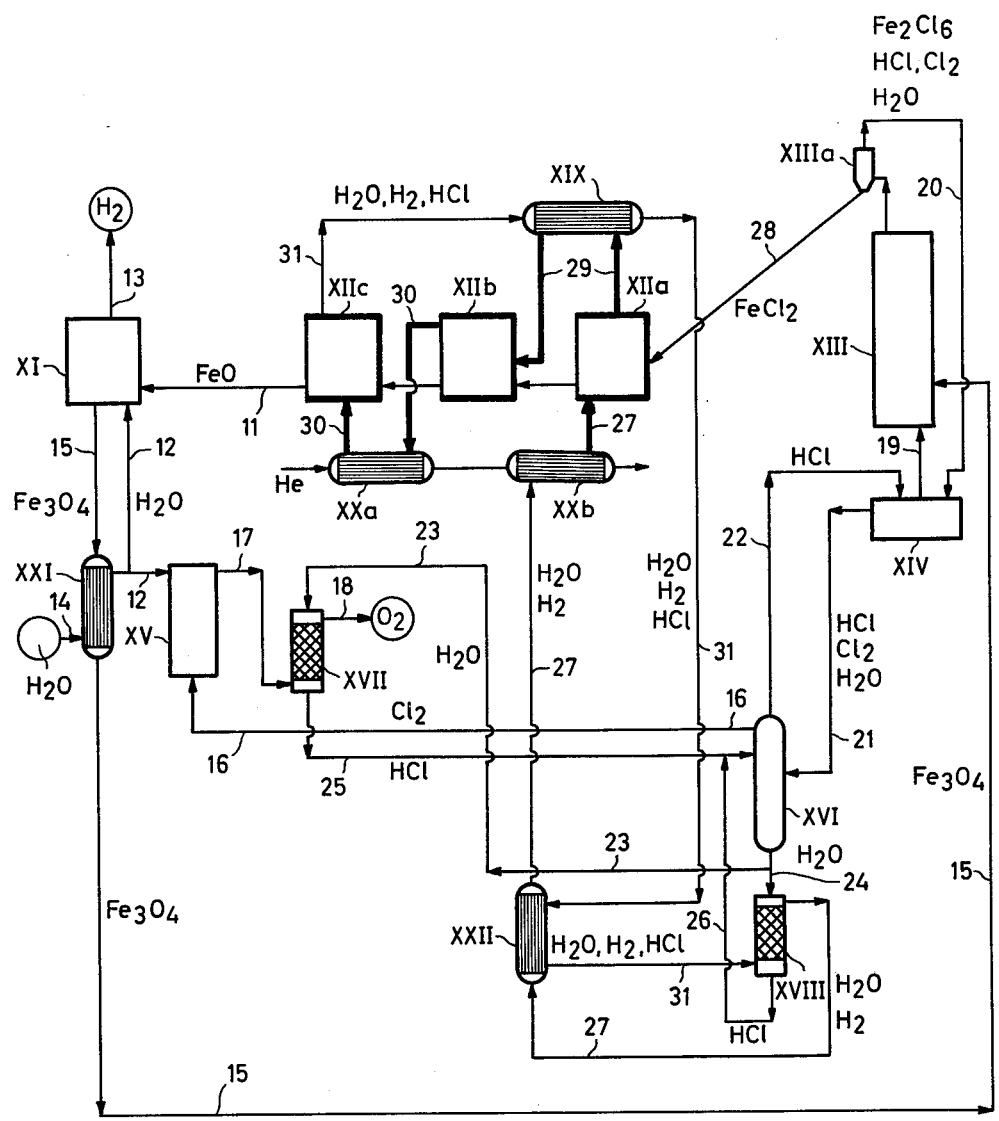

FIG. 2 illustrates one of the possible forms of carrying out the novel improvement in the frame of the known thermochemical process described.

Introduced into the hydrogen generator XI by means of conduit 11 is iron(II)-oxide and by means of conduit 12 is water vapor and they are reacted at about 1250–1300 K to iron(II, III)-oxide and hydrogen. Hydrogen is drawn off as product gas by means of conduit 13. The iron(II, III)-oxide generated in the first process step is supplied to the heat exchanger XXI, with the water supplied by means of conduit 14. A portion of the water vapor generated in heat exchanger XXI is returned to hydrogen generator XI by conduit 12 while another portion is conducted by means of conduit 12 into the oxygen generator XV and there is reacted with the chlorine supplied by means of conduit 16 at about 900–1300 K to hydrogen chloride and oxygen. The resulting gas mixture is then conducted by means of conduit 17 into washer XVII, wherein an about 20% aqueous hydrogen chloride solution is prepared, while the oxygen is removed as product gas by means of conduit 18.

In the chlorinating apparatus XIII, the iron (II, III)-oxide is reacted with hydrogen chloride at about 700–800 K in a mixture consisting of gaseous dimeric iron(III)-chloride and an excess of hydrogen chloride supplied from the separating container XIV by means of conduit 19. The reaction mixture is then conducted to separator XIIIa. There, solid iron(II)-chloride is separated, while the gaseous products are returned to the separating container XIV by means of conduit 20. Drawn off from container XIV by means of conduit 21 is a mixture of hydrogen chloride, chlorine and water vapor, which is decomposed into chlorine and water in column XVI with a standardization of a cycle of hydrogen chloride through conduit 22. The chlorine is conducted by way of conduit 16 into the oxygen generator XV; the water is supplied to washers XVII and XVIII by means of conduits 23 and 24. The over 20% aqueous hydrogen chloride solution obtained in washers XVII and XVIII is conducted into column XVI by means of conduits 25 and 26 and is processed there. The hydrogen obtained in washer XVIII is supplied to the first reaction chamber XIIa of the iron(II)-chloride hydrolysis with water by way of conduit 27 after passing heat exchangers XXII and XXb at a respectively elevated temperature. The first step of the conversion of the iron(II)-chloride supplied by way of conduit 28, to iron-(II)-oxide takes place here at about 800 K. The reaction mixture subsequently passes reaction chambers XIIb and XIIc, maintained at about 1000 K and 1200 K. In this connection, the iron(II)-chloride is completely converted to iron(II)-oxide, which is supplied by way of conduit 11 to the hydrogen generator XI. The gaseous products resulting from this conversion at given times are conducted by way of conduit 29 and heat exchanger XIX or by way of conduit 30 and heat exchanger XXa and thus brought to the respective higher temperature level. In heat exchangers XXa and XXb is utilized the heat of about 1300 K hot helium, which was used as the coolant in a high-temperature nuclear reactor. The gas mixture drawn off from the conversion step XIIc through conduit 31 is conducted, after passing heat exchangers XIX and XXII, to washer XVIII where its processing takes place. Thereby both the solids cycle as well as the gas cycle are closed. It is obvious that the coupling of process heat from the high-temperature nuclear reactor by means of the hot helium occurs only in the gas cycle, whereby the very difficult problems of the solid and gaseous heat exchange are avoided.

What we claim is:

1. In a thermochemical process for production of hydrogen and oxygen from water with the steps of
    (a) reacting water vapor with iron(II)-oxide at a temperature of between about 600 to 1300 K to form iron(II, III)-oxide and hydrogen;
    (b) reacting chlorine with (1) water vapor or (2) a member selected from the group consisting of iron (II, III)-oxide, iron(II)-oxide or mixtures thereof at a temperature of between about 550 to 1300 K to form respectively (1) oxygen and hydrogen chloride or (2) oxygen and iron(II)-chloride by cleaving the iron(III)-chloride obtained as an intermediate product to iron(II)-chloride and chlorine while recovering the hydrogen chloride from (1) or chlorine from (2) for recycle;
    (c) reacting iron(II, III)-oxide obtained in step (a) with hydrogen chloride or a mixture of hydrogen chloride and chlorine at a temperature of between about 500 to 1300 K to form iron(II)-chloride whereby any iron(III)-chloride obtained as an intermediate product is cleaved to iron (II)-chloride and chlorine while recovering the chlorine for recycle;
    (d) hydrolyzing iron(II)-chloride obtained with water vapor at a temperature of between about 700 to 1200 K; and
    (e) recovering hydrogen and oxygen produced,
the improvement which comprises hydrolyzing the iron(II)-chloride with water vapor in the presence of hydrogen at a temperature of between about 700 to 1200 K in at least two series-connected reaction chambers which are maintained at sequentially higher temperature levels at a given time with the ratio of water vapor to hydrogen between about 1:3 to 2:1 to produce an iron product consisting of iron(II)-oxide.

2. A process according to claim 1 wherein heat is introduced into the hydrolysis reaction by heating at least one gaseous reactant before introducing into the hydrolysis reaction by means of indirect heat exchange with a hot gaseous coolant of a high-temperature nuclear reactor.

3. A process according to claim 1 wherein heat is introduced into the hydrolysis reaction by heating at least one gaseous reactant before introducing into the hydrolysis reaction by means of indirect heat exchange with at least a part of the product gas leaving the hydrolysis reaction.

* * * * *